United States Patent [19]
Chang et al.

[11] Patent Number: 5,940,506
[45] Date of Patent: Aug. 17, 1999

[54] METHOD OF USING A HAND-HELD DEVICE TO PROTECT INFORMATION STORED IN A COMPUTER SYSTEM

[75] Inventors: Jackson Chang; Dai-Shui Ho, both of Taipei, Taiwan; Jie Zhu; Gang Hong, both of Shang Hai City, China

[73] Assignee: Inventec Corporation, Taipei, Taiwan

[21] Appl. No.: 08/999,055

[22] Filed: Dec. 11, 1997

[30] Foreign Application Priority Data

Apr. 15, 1997 [TW] Taiwan ................................. 86104836

[51] Int. Cl.⁶ ................................ H04L 9/00; H04L 1/00
[52] U.S. Cl. ................................. 380/4; 380/52; 380/25
[58] Field of Search .......................................... 380/25, 4

[56] References Cited

U.S. PATENT DOCUMENTS

| | | | |
|---|---|---|---|
| 4,484,025 | 11/1984 | Ostermann et al. | 178/22.09 |
| 5,623,546 | 4/1997 | Hardy et al. | 380/4 |
| 5,754,646 | 5/1998 | Williams et al. | 380/4 |
| 5,778,071 | 7/1998 | Caputo et al. | 380/25 |
| 5,781,723 | 7/1998 | Yee et al. | 395/186 |
| 5,815,577 | 9/1998 | Clark | 380/52 |
| 5,825,878 | 10/1998 | Takahashi et al. | 380/4 |

OTHER PUBLICATIONS

Nicolai, "Encryption Decyphered; Encoding Locks Your Data Away from Anyone Not Possessing the Key", Computers & Electronics, vol. 22, pp. 64–68, Jun. 1984.

*Primary Examiner*—Gilberto Barron, Jr.
*Assistant Examiner*—Justin T. Darrow
*Attorney, Agent, or Firm*—Bacon & Thomas, PLLC

[57] ABSTRACT

A method of using a hand-held device to produce an encryption/decryption application program for protecting information stored in a computer system by transmitting the produced encryption/decryption application program to the computer system through a communication measure subject to a corresponding communication protocol, permitting the encryption/decryption application program to be cleared from the computer system after the communication between the hand-held device and the computer system has been terminated.

8 Claims, 6 Drawing Sheets

METHOD OF USING A HAND-HELD DEVICE TO PROTECT INFORMATION STORED IN A COMPUTER SYSTEM

BACKGROUND OF THE INVENTION

The present invention relates to a method of using a hand-held device to protect information stored in a computer system, and more particularly to such a method of using a PDA (personal digital assistant), electronic dictionary, organizer, or any of a variety of hand-held device to communication with a computer system through corresponding communication interfaces, so as to protect information stored in the computer system.

Following fast development of high technology, the size of a computer has been greatly reduced. Nowadays, a variety of advanced notebook computers as well as hand-held devices have been developed. The application of computers greatly improve our working efficiency, and shorten the distance between people. Regular hand-held devices are designed for particular purposes. However, due to certain limitation in technology, these hand-held devices cannot replace personal computers. Therefore, these hand-held devices are commonly used in certain conditions to store and process certain data. For a long-term preservation of the information being stored in hand-held device or for a complicated analysis of the information, a communication technology shall be employed to transmit the information from the hand-held device to a personal computer. Further, at present time, a variety of communication networks have been intensively used for the transmission of information from a distance. It is important to efficiently utilize obtained information, and to well protect it. More particularly, people in the information industry have to well protect private information in one's personal computer when one goes away from one's personal computer. Conventionally, one may protect one's private information in a computer system by setting a code in it, or encrypting one's private information by means of the application of an encryption procedure. In case one owns a hand-held device and a personal computer, one shall have to set a code in the hand-held device and the personal computer separately, or to use an encryption procedure in encrypting the information in the hand-held device and the information in the personal computer. This method is complicated, and its effect is still not guranteed. The code set in a computer system can be easily broken by person skilled in the art. To a computer hacker, it is easy to break a password set in a computer system by means of employing DEBUG measure, tracing the password patiently, or using certain code-breaking procedures. Why the conventional password setting method cannot effectively protect one's private information in a personal computer? It is because all encryption measures are put in the personal computer, these measures can be easily fetched by others. This method is just like locking one's personal precious articles in a drawer with the key left outside the drawer.

SUMMARY OF THE INVENTION

The present invention has been accomplished under the circumstances in view. It is one object of the present invention to provide a method of using a hand-held device to protect information stored in a computer system. When to encrypt the information, the hand-held device is operated to produce an encryption/decryption application program and to send the encryption/decryption application program to the computer system through a communication measure subject to a corresponding communication protocol. After the information has been encrypted and the communication has been terminated, the encryption/decryption application program is cleared from the computer system, and only encrypted information is stored in the computer system.

It is another object of the present invention to provide a method of using a hand-held device to protect information stored in a computer system which enables the user to encrypt information stored in the computer system through the hand-held device simply by setting a code at the hand-held device.

It is still another object of the present invention to provide a method of using a hand-held device to protect information stored in a computer system which enables the encryption procedure to be stored in the hand-held device only, so that other persons are prohibited from breaking the code in the computer system.

BRIEF DESCRIPTION OF THE DRAWINGS

FIGS. 6-1 and 6-2 are flow charts showing the encryption procedure at the computer system according to the present invention.

DETAILED DESCRIPTION OF THE PREFERRED EMBODIMENT

Figure 1:
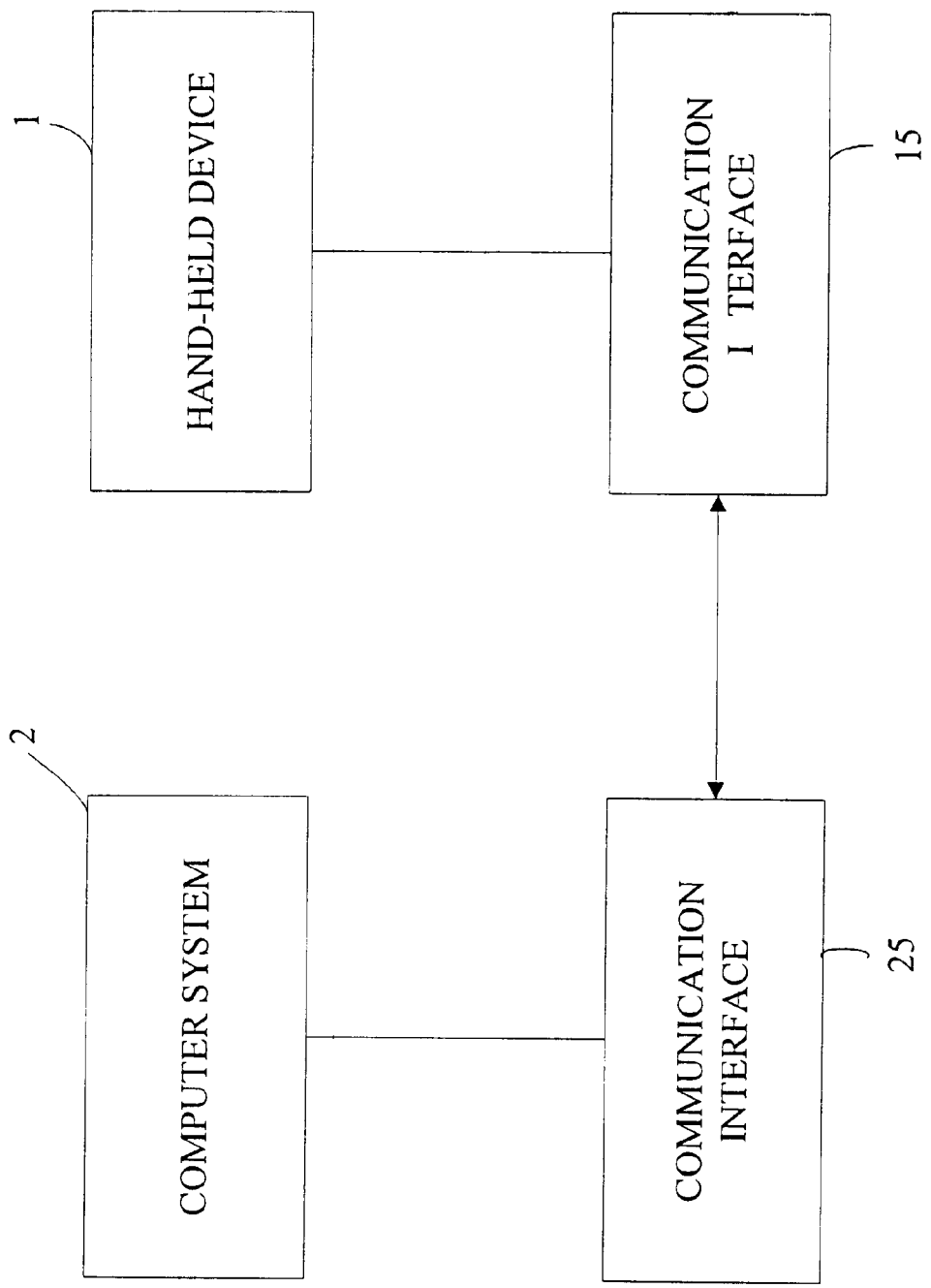
FIG. 1 is a block diagram showing the connection between a hand-held device and a computer system according to the present invention.

Referring to FIG. 1, a hand-held device 1 is linked to a computer system 2 by means of a respective communication interface 15;25 through a communication network.

Figure 2:
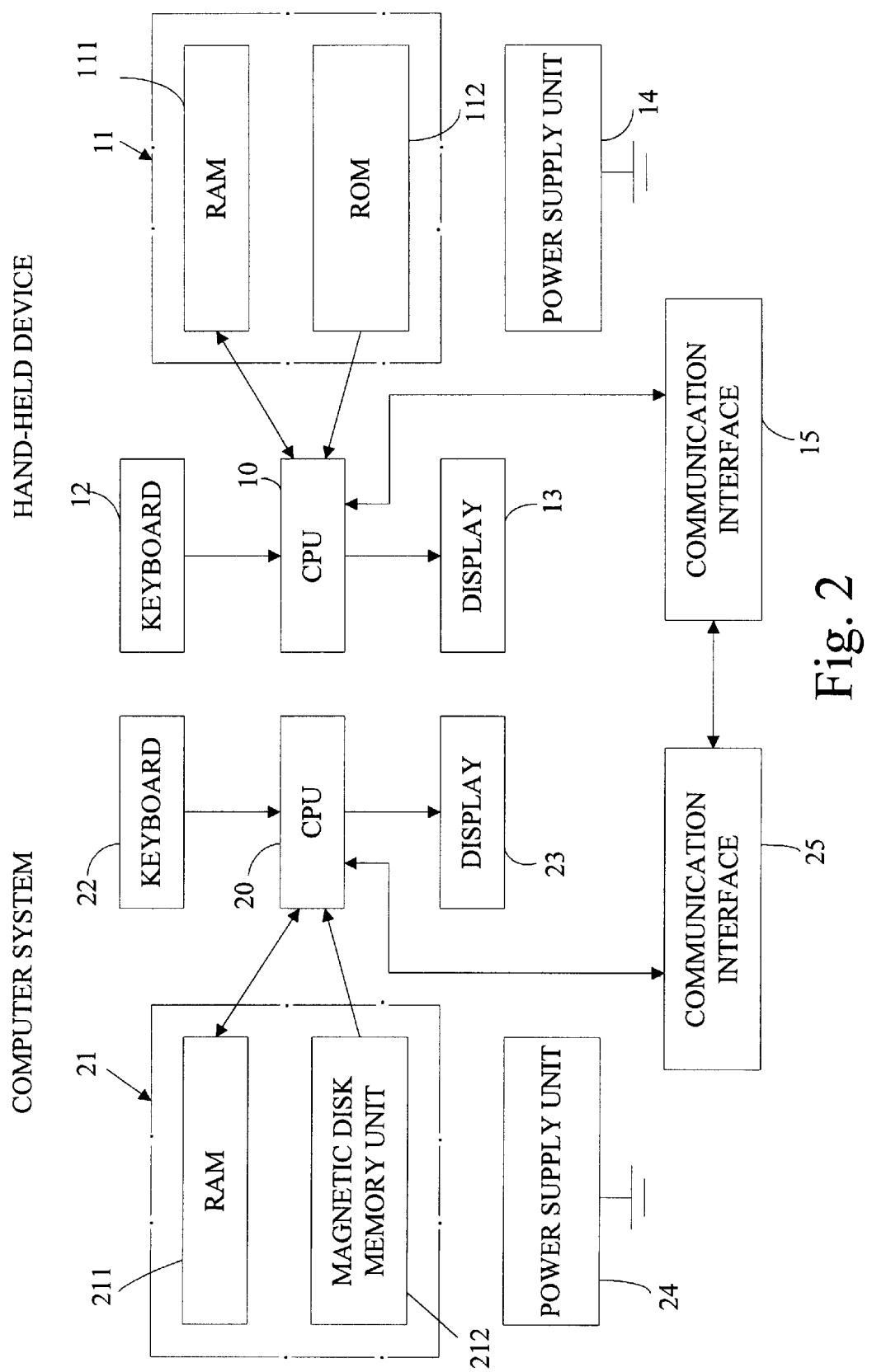
FIG. 2 is a circuit block diagram showing the communication between the hand-held device and the computer system according to the present invention.

Referring to FIG. 2, the hand-held device 1 is comprised of a CPU 10, a memory unit 11, a keyboard 12, a display 13, a power supply unit 14, and a communication interface 15. The memory unit 11 comprises a RAM (random access memory) 111 and a ROM (read only memory) 112. The RAM 111 is adapted to store information, code, related encryption/decryption procedure data, as well as feature value of encrypted information. The power supply unit 14 provides the necessary power supply for protecting the information, code, feature value of encrypted information stored in the RAM 111. The computer system 2 comprises a CPU 20, a memory unit 21, a keyboard 22, a display 23, a power supply unit 24, and a communication interface 25. The memory unit 21 comprises a RAM 211 and a magnetic disk memory unit 212. The RAM 211 is adapted to temporarily store encryption/decryption procedures and feature value of encrypted information received from the hand-held device 1.

Figure 4:
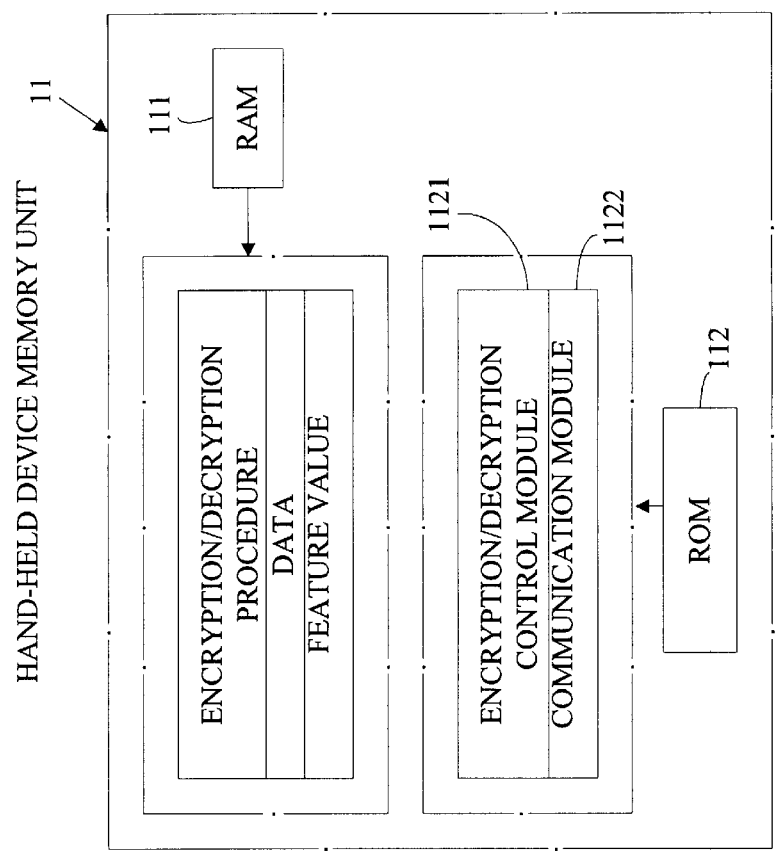
FIG. 4 is a circuit block diagram of the memory unit of the hand-held device according to the present invention.

Referring to FIG. 4, the ROM 112 of the memory unit 11 of the hand-held device 1 comprises an encryption/decryption procedure control module 1121, and a communication module 1122 for intercommunication with the computer system 2.

Figure 3:
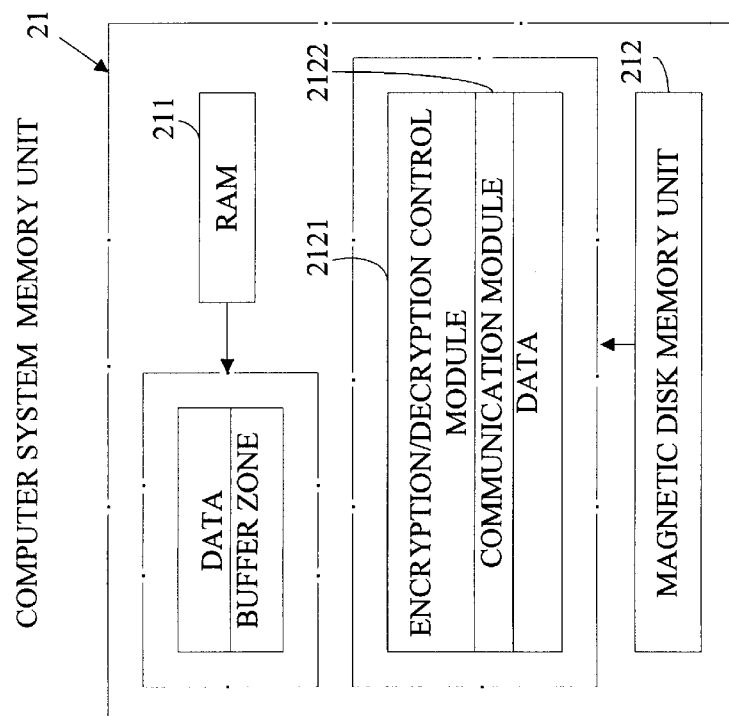
FIG. 3 is a circuit block diagram of the memory unit of the computer system according to the present invention.

Referring to FIG. 3, the magnetic disk memory unit 212 comprises an encryption/decryption procedure control module 2121 matching with the encryption/decryption procedure control module 1121 of the ROM 112 of the hand-held device 1, and a communication module 2122 matching with the communication module 1122 of the ROM 112 of the hand-held device 1. The magnetic disk memory unit 212 is also used to store information encrypted in the computer system 2. The communication modules 1122;2122 include a communication protocol and an application procedure required for intercommunication.

The control modules 1121;2121 of the hand-held device 1 and the computer system 2 correspond to each other, and execute the respective encryption/decryption procedure control in the respective device or system. The communication modules 1122;2122 of the hand-held device 1 and the computer system 2 communicate with each other through the respective communication interfaces 15;25 for data transmission subject to the defined communication protocol and communication application procedure. Current communication technology and protocols, such as data transmission cables, infrared, communication networks, etc., can be employed.

Figure 5:
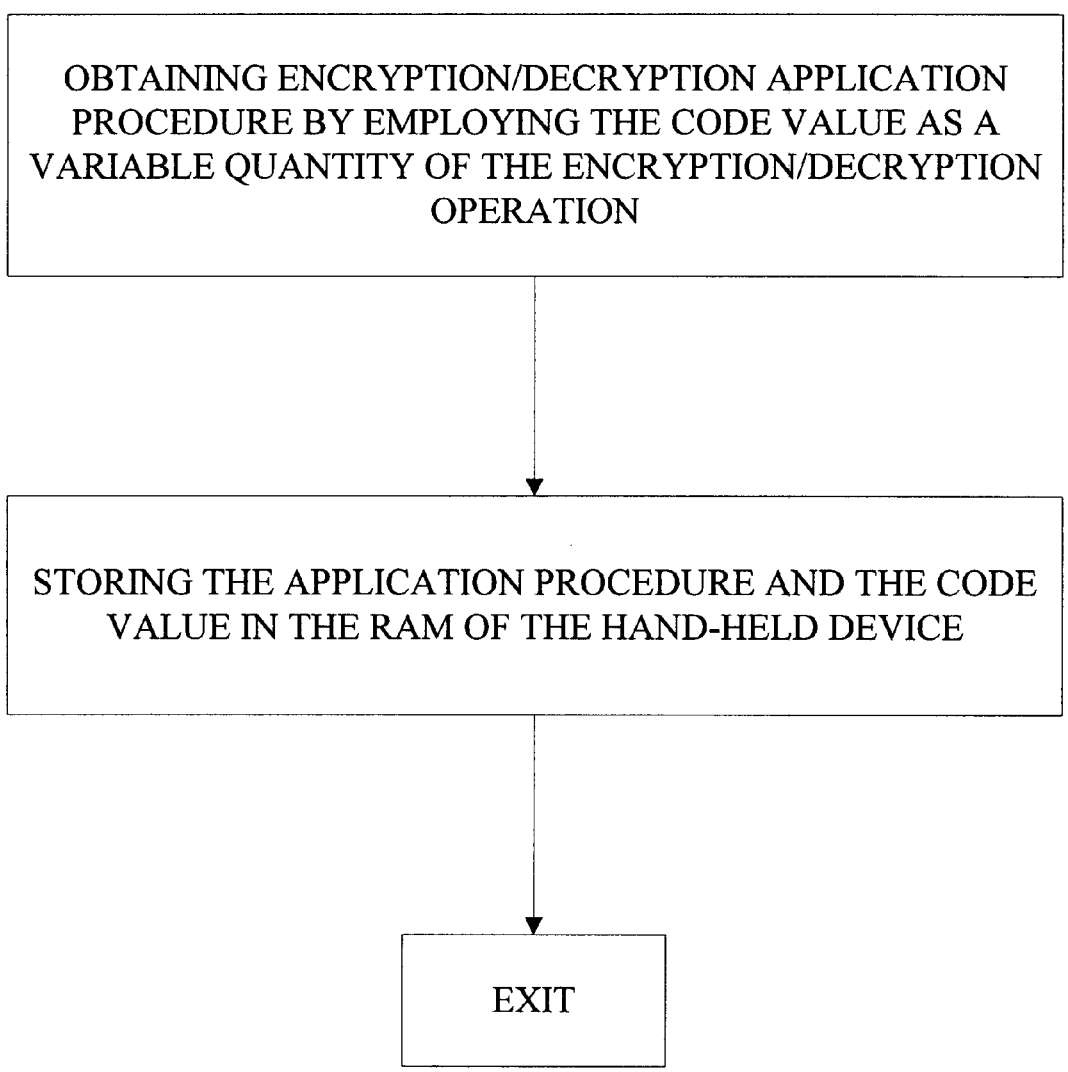
FIG. 5 is a flow chart showing the encryption procedure at the hand-held device according to the present invention.

The method of using the aforesaid hand-held device to protect the aforesaid computer system includes the procedures of:

I. Setting a code (see the flow chart shown in FIG. 5):

i) Start the hand-held device 1.

ii) Select the code setting function from the hand-held device 1.

iii) Input a code value for example 100 through the keyboard 12.

iv) The CPU 10 of the hand-held device 1 reads in pre-set encryption operation from the RAM 111, subject to the encryption/decryption procedures stored in the control module 1121 of the ROM 112, after the code value has been sent to the CPU 10, which encryption operation has a variable quantity that can be a code value, or a value calculated subject to the code value.

v) The CPU 10 sends the obtained code value and encryption/decryption procedure to the RAM 111, and uses the power supply provided by the power supply unit 14 to store the data.

vi) Finish the code setting on the hand-held device 1.

Figures 1, 6:
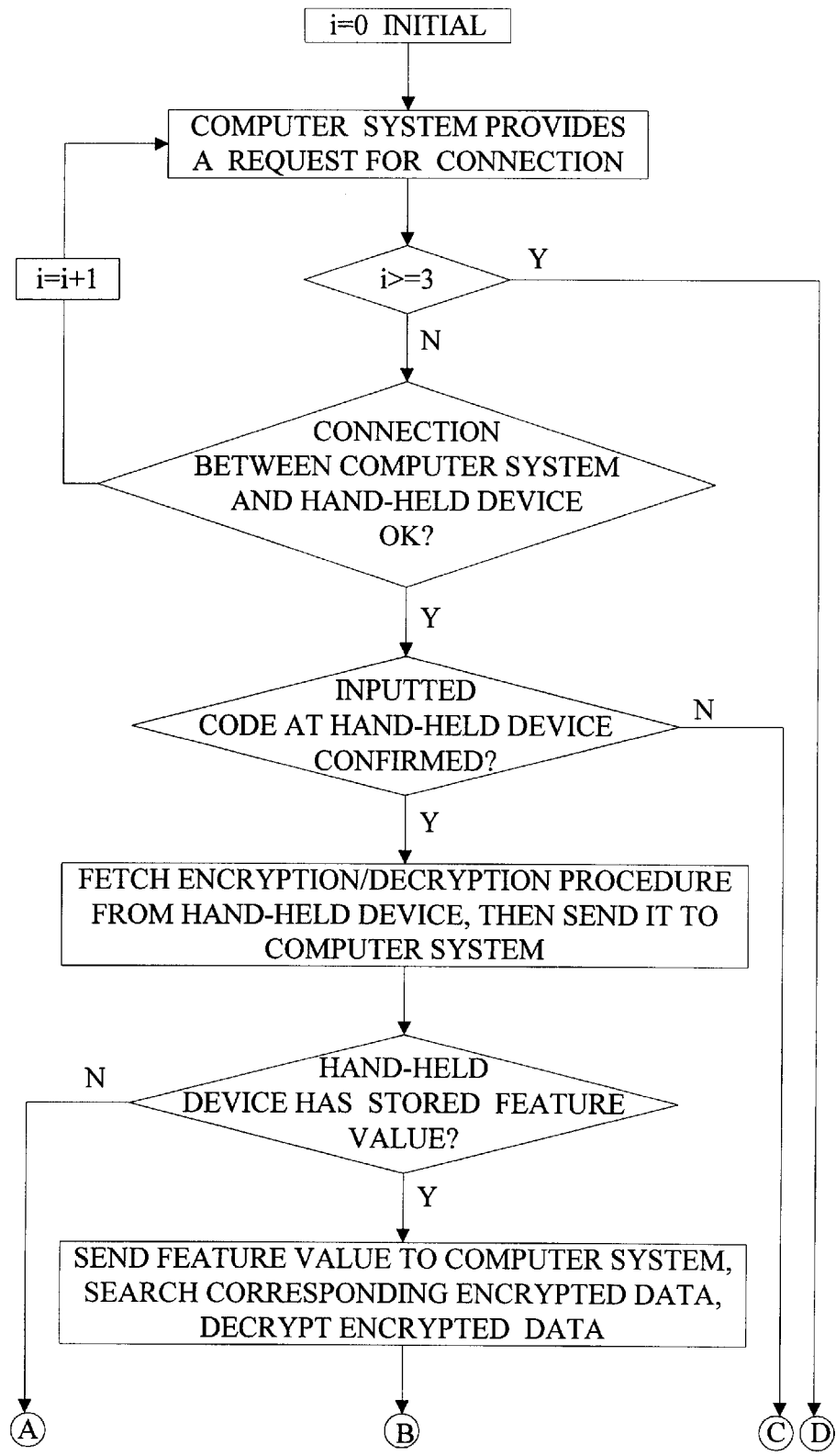
Figures 2, 6:
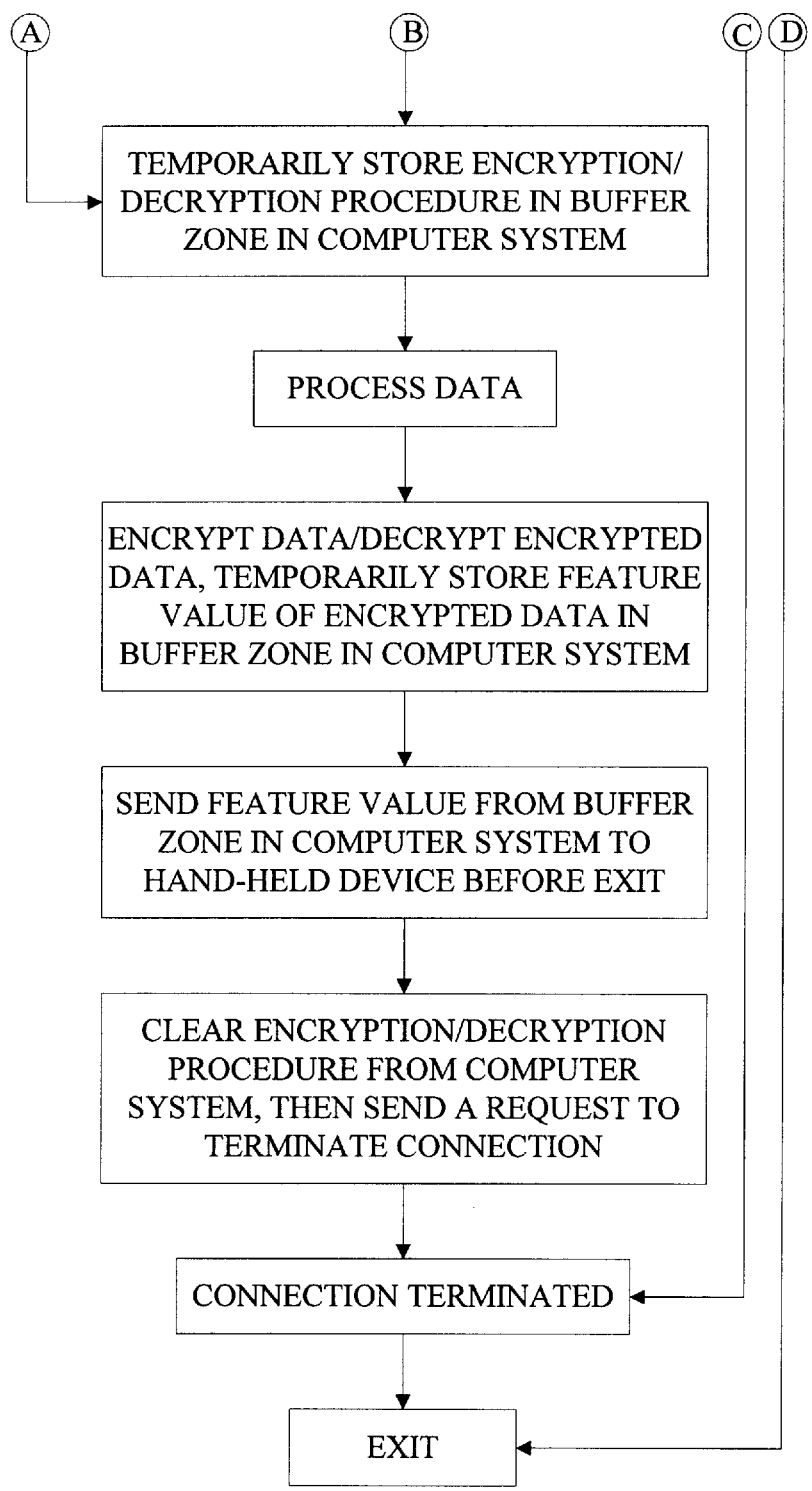

II. Starting connection between the hand-held device 1 and the computer system 2 after code setting (see the flow chart shown in FIGS. 6-1 and 6-2):

i) Start the computer system 2.

ii) Select the communication module 2122 from the computer system 2, then command the CPU 20 of the computer system 2 to start communication procedure by: initializing the computer system 2 to set 0 for the variable quantity i of the number of times of controlling the communication connection, permitting the computer system 2 to provide a search request to the surrounding environment; enabling the search request to be sent via the communication interface 25 of the computer system 2 to the communication module 1122 upon receipt of same by the communication interface 15 of the hand-held device 1, thereby causing the communication module 1122 to run communication procedure subject to the set communication protocol, and to give a response to the search request, permitting the response to be sent to the computer system 2, so that the computer system 2 gives a request for connection upon receipt of the response, permitting the request for connection to be sent to the hand-held device 1 in the same manner as the procedure for the aforesaid search request, and enabling the hand-held device 1 to give acknowledge upon receipt of the request for connection, and therefore the connection for communication is done and data transmission is allowed to start. When at this status, there are two points to be taken into account: (a) the computer system selects only one hand-held device and provides it with a request for connection if there are more than one hand-held device giving a response; (b) the computer system adds 1 to the variable quantity i of the number of times of controlling the communication connection when it receives no response within a predetermined length of time, and then sends a search request again; when i>3, it means that there is no such apparatus existed in the surrounding environment for communication with the computer system, and the computer system immediately stops the communication procedure. This procedure is requisite in infrared communication or communication network.

iii) The CPU 10 of the hand-held device 1 controls the encryption/decryption procedure subject to the control module 1121 in the ROM 112 when connected, prompting the user to input the code through the keyboard 12, then the CPU 10 picks up the code value from the RAM 111 through the control module 1121 and then makes a judgment, and then CPU 10 prompts the user to input the code again if the inputted code is denied, and the CPU 10 interrupts the connection after a predetermined number of incorrect code inputs, or proceeds to the next step when the inputted code is acknowledged.

iv) The CPU 10 of the hand-held device 1 reads in the encryption/decryption procedure from the RAM 111 through the control module 1121, and then sends the encryption/decryption procedure to the computer system 2 through the control module 1121, and then computer system 2 immediately stores the encryption/decryption procedure in the buffer zone in the RAM 211 through the control module 2121.

v) At the same time, the CPU 10 of the hand-held device 1 reads in the data from the RAM 11 through the control module 1121, and then checks if there is a feature value of encrypted information contained in the data, and then the CPU 10 sends the information to the computer system 2 if there is no feature value detected, permitting the computer system to keep the encryption/decryption procedure in the buffer zone in the RAM 211; on the contrary, a next step is proceeded if there is a feature value contained in the data.

vi) When the hand-held device 1 finds a feature value of encrypted information, the feature value is sent by the hand-held device 1 to the computer system 2, causing the CPU 20 of the computer system 2 to read in the data from the magnetic disk memory unit 212 through the control module 2121, and searches from the data the encrypted information corresponding to the feature value, and then the CPU 20 reads in the encryption procedure from the buffer zone in the RAM 211, so as to encrypts the encrypted information. In step iv), if a person uses a second hand-held device of the same type to keep running the procedure, the encryption procedure will be skipped because there is no corresponding feature value in the second hand-held device. In case the second hand-held device has the same feature value, the information is still not readable after decryption because a different code provides a different encryption/decryption procedure.

vii) After information decryption, the CPU 20 of the computer system 2 stores the encryption/decryption procedure in the buffer zone of the RAM 211 again.

viii) At this state, the user is allowed to edit the information in the computer system 2.

ix) When the information is edited and to be encrypted, the CPU 20 of the computer system 2 reads in the encryption procedure from the buffer zone in the RAM 211 and encrypts the information, then fetches the feature value of the encrypted information through the control module 2121 after the end of the encryption, and then keeps the feature value in the buffer zone of the RAM 211; in the same manner, the user can use the decryption procedure and feature value stored in the buffer zone of the RAM 211 to decrypt the information.

x) When the user selects to exit from the connection after data editing and encryption operation, the computer system 2 sends the feature value of the encrypted information that is stored in the buffer zone of the RAM 211 to the hand-held device 1, permitting it to be maintained in the RAM 111 of the hand-held device 1.

xi) When the aforesaid procedure is done, the CPU 20 of the computer system 2 controls the control module 2121 to clear the encryption/decryption procedure and the feature value of the encrypted information from the RAM 211, and at this moment, only the encrypted information is kept in the computer system 2.

xii) Thereafter, the CPU 20 of the computer system 2 sends a request to end the connection through the communication module 2122, and thus the connection between the hand-held device 1 and the computer system 2 is stopped.

xiii) The end.

III. Changing the code.

i) If to change the code from the hand-held device 1 when the hand-held device 1 is not in connection with the computer system 2, the invention will inform the user that the encrypted data will not be correctly decrypted if the code is changed; if the user insists to change the code, the code and the new encryption/decryption procedure thus produced will be stored in the hand-held device 1.

ii) When the hand-held device 1 is in connection with the computer system 2:

a) When the original code is passed:

After the code has been changed from the hand-held device 1, the new code and the newly produced encryption/decryption procedure are stored in the hand-held device 1, then the newly produced encryption/decryption procedure is transmitted to the computer system 2 to replace the original encryption/decryption procedure stored in the buffer zone in the computer system 2.

b) When the original code is not passed:

The invention will prompt the user that the encrypted data will not be correctly decrypted if the code is changed; if the user insists to change the code, the code and the new encryption/decryption procedure thus produced will be stored in the hand-held device 1.

IV. Decrypting the encrypted information when the user forgets the code.

i) During production, every hand-held device is given with a serial number, and the serial number of every hand-held device is its prime code; when the user inputs the serial number of the hand-held device being used, the hand-held device picks up the set code from the RAM 111 of the hand-held device through a particular procedure, and shows the code through the display on the hand-held device. Of course, this is one of a variety of practical methods.

V. Feature value:

The feature value required during encryption/decryption procedure can be expressed by the content of the first or last few words of the encrypted information. Of course, this is simply one of a variety of practical methods.

VI. Obtaining encryption/decryption procedure:

The method of obtaining encryption/decryption procedure can be as defined in iv) of II). However, the user can design a way to obtain encryption/decryption procedure. For example, the user can use the hand-held device to provide a character sign table after input of the code, so that the user can design a code table subject to the order set by the user. This method effectively prohibit others to decrypt the user's personal information.

As indicated above, the invention uses a hand-held device as an encryption tool. Through communication and data transmission between the hand-held device and the computer system, encryption/decryption procedure produced by and stored in the hand-held device can be transmitted to the computer system for application, so as to protect information stored in the computer system. The function provided by the present invention enables the user to encrypt information stored in the computer system by means of operating the hand-held device, without letting the encryption/decryption tool means be stored in the computer system, therefore the invention prevents others from decrypting the encrypted information by using DEBUG or tracing the encryption/decryption procedure. Furthermore, because the invention employs well developed communication technology to ensure accurate data transmission, no any specially designed data transmission hardware or software is needed, and no extra product cost is needed.

It is to be understood that the drawings are designed for purposes of illustration only, and are not intended as a definition of the limits and scope of the invention disclosed.

What the invention claimed is:

1. A method of using a hand-held device to protect information stored in a computer system, the method comprising the steps of:

i) inputting a code into a hand-held device so as obtain an encryption/decryption procedure, then storing the encryption/decryption procedure thus obtained in the hand-held device;

ii) using a communication interface on the hand-held device and a communication interface on a computer system to set up a connection between the hand-held device and the computer system subject to a corresponding communication protocol and communication application procedure;

iii) operating the hand-held device to transmit the encryption/decryption procedure from the hand-held device to the computer system, and to judge if there is information in the computer system to be decrypted, so as to run the decryption procedure at the computer system when there is information in the computer system to be decrypted, or to temporarily store the encryption/decryption procedure in the computer system when there is no information in the computer system to be decrypted;

iv) reading in the encryption procedure temporarily stored in the computer system and then encrypting the information when required, and simultaneously fetching the feature value of the encrypted information, permitting the fetched feature value to be temporarily stored in the computer system;

v) enabling the computer system to send the feature value of the encrypted information temporarily stored therein back to the hand-held device, and then to clear the encryption/decryption procedure from the computer system when communication termination is selected; and vi) terminating the connection between the hand-held device and the computer system, and further comprising the step of encoding the hand-held device with a serial number, permitting the serial number to be used as a prime code for inputting into the hand-held device to fetch the set code stored in the hand-held device through a predetermined procedure.

2. The method of claim 1 further comprising the step of reading in the decryption procedure temporarily stored in the computer system for matching with the feature value to decrypt the encrypted information when needed.

3. The method of claim 1, wherein the hand-held device produces a code value and an encryption/decryption procedure subject to an encryption operation set in a memory unit in the hand-held device when the code is inputted into the hand-held device.

4. A method of using a hand-held device to protect information stored in a computer system, the method comprising the steps of:

i) inputting a code into a hand-held device so as obtain an encryption/decryption procedure, then storing the encryption/decryption procedure thus obtained in the hand-held device;

ii) using a communication interface on the hand-held device and a communication interface on a computer system to set up a connection between the hand-held device and the computer system subject to a corresponding communication protocol and communication application procedure;

iii) operating the hand-held device to transmit the encryption/decryption procedure from the hand-held device to the computer system, and to judge if there is information in the computer system to be decrypted, so as to run the decryption procedure at the computer system when there is information in the computer system to be decrypted, or to temporarily store the encryption/decryption procedure in the computer system when there is no information in the computer system to be decrypted;

iv) reading in the encryption procedure temporarily stored in the computer system and then encrypting the information when required, and simultaneously fetching the feature value of the encrypted information, permitting the fetched feature value to be temporarily stored in the computer system;

v) enabling the computer system to send the feature value of the encrypted information temporarily stored therein back to the hand-held device, and then to clear the encryption/decryption procedure from the computer system when communication termination is selected; and vi) terminating the connection between the hand-held device and the computer system, wherein the hand-held device produces a code value and an encryption/decryption procedure subject to an encryption operation set in a memory unit in the hand-held device when the code is inputted into the hand-held device, and wherein said encryption operation has a variable quantity that can be a code value, or a value calculated subject to the code value.

5. A method of using a hand-held device to protect information stored in a computer system, the method comprising the steps of:

i) inputting a code into a hand-held device so as obtain an encryption/decryption procedure, then storing the encryption/decryption procedure thus obtained in the hand-held device;

ii) using a communication interface on the hand-held device and a communication interface on a computer system to set up a connection between the hand-held device and the computer system subject to a corresponding communication protocol and communication application procedure;

iii) operating the hand-held device to transmit the encryption/decryption procedure from the hand-held device to the computer system, and to judge if there is information in the computer system to be decrypted, so as to run the decryption procedure at the computer system when there is information in the computer system to be decrypted, or to temporarily store the encryption/decryption procedure in the computer system when there is no information in the computer system to be decrypted;

iv) reading in the encryption procedure temporarily stored in the computer system and then encrypting the information when required, and simultaneously fetching the feature value of the encrypted information, permitting the fetched feature value to be temporarily stored in the computer system;

v) enabling the computer system to send the feature value of the encrypted information temporarily stored therein back to the hand-held device, and then to clear the encryption/decryption procedure from the computer system when communication termination is selected; and vi) terminating the connection between the hand-held device and the computer system, wherein the feature value required during encryption/decryption can be expressed by the content of the first or last few words of the encrypted information.

6. The method of claim 4, further comprising the step of reading in the decryption procedure temporarily stored in the computer system for matching with the feature value to decrypt the encrypted information when needed.

7. The method of claim 5, further comprising the step of reading in the decryption procedure temporarily stored in the computer system for matching with the feature value to decrypt the encrypted information when needed.

8. The method of claim 5, wherein the hand-held device produces a code value and an encryption/decryption procedure subject to an encryption operation set in a memory unit in the hand-held device when the code is inputted into the hand-held device.

* * * * *